United States Patent [19]

Kamada

[11] Patent Number: 5,253,849
[45] Date of Patent: Oct. 19, 1993

[54] WHEEL SUSPENSION STRUCTURE WITH BUFFERING LEAF SPRINGS

[76] Inventor: Yoshihide Kamada, 146-11, Oaza Kami, Ageo-shi, Saitama-ken, Japan

[21] Appl. No.: 732,612

[22] Filed: Jul. 19, 1991

[51] Int. Cl.⁵ .................. F16F 1/20; B60B 9/04
[52] U.S. Cl. ................... 267/36.1; 152/70; 152/75; 301/114; 301/111; 411/204; 411/373; 411/965; 267/165
[58] Field of Search ........ 267/36.1, 37.3, 158, 267/160, 164, 165; 152/17, 69, 70, 75-77, 80; 301/108 R, 108 S, 126, 131, 114, 122, 111; 411/965, 373, 204, 376, 429. 191-192, 221; 74/574

[56] References Cited

U.S. PATENT DOCUMENTS

| | | | |
|---|---|---|---|
| 569,215 | 10/1896 | Lewis | 411/429 X |
| 643,939 | 2/1900 | Brigham | 411/204 |
| 1,073,498 | 9/1913 | Köszegi | 152/75 X |
| 1,076,388 | 10/1913 | Parrish | 411/221 X |
| 1,207,928 | 12/1916 | Keating | 152/70 X |
| 2,717,807 | 9/1955 | Kapp | 301/114 X |
| 3,631,585 | 1/1972 | Stamm | 301/126 X |
| 3,883,180 | 5/1975 | Kain | 301/108 R X |
| 4,331,210 | 5/1982 | Petrak | 301/126 X |
| 4,344,654 | 8/1982 | Apezynski | 301/37 R |

FOREIGN PATENT DOCUMENTS

2024854 12/1971 Fed. Rep. of Germany ...... 411/373

Primary Examiner—Robert J. Oberleitner
Assistant Examiner—Josie A. Ballato
Attorney, Agent, or Firm—Flynn, Thiel, Boutell & Tanis

[57] ABSTRACT

A wheel suspending device for a vehicle has a plurality of leaf springs disposed inside of a rim of the wheel. Each of the leaf springs is a chord member, two extremities of which are supported by the rim member, and a central portion of which is supported by an axle. The axle is inserted in a sleeve, which is fixed to the axle by a nut screwed on an end portion of the axle. A protrusion formed at a center of an inner surface of a cap linked with the nut is inserted in a hole formed in an end surface of the axle.

9 Claims, 4 Drawing Sheets

WHEEL SUSPENSION STRUCTURE WITH BUFFERING LEAF SPRINGS

FIELD OF THE INVENTION

The present invention relates to an improvement of a suspending device for a vehicle.

BACKGROUND OF THE INVENTION

The suspending device for a vehicle is disposed for the purpose of buffering shocks given by the road surface and transferred to the frame or the body. Usually a measure of disposing springs between the wheels and the frame and using shock absorbers together therewith is taken therefor.

The buffering springs are mounted on the axles of the front and the rear wheels and secured to the frame through spring brackets. Leaf springs, coil springs, torsion bars, etc. are used for these buffering springs. Usually leaf springs are used for the rear wheels and coil springs are mounted on the front wheel. Further almost all the passenger cars are provided with independent suspending devices acting as buffer independently from each other for the left and right front wheels.

However for the suspending device constructed as described above the mechanism is complicated and the number of parts is also very great. In addition, the mounting operation requires much labor.

OBJECT OF THE INVENTION

The present invention has been done for solving thoroughly the problem described above and the principal object thereof is to provide a suspending device for a vehicle capable of simplifying remarkably the mechanism and reducing the number of parts so that it can be simply and easily mounted.

SUMMARY OF THE INVENTION

In order to achieve the above object, according to the present invention, it is intended to solve the problem described above by disposing a plurality of leaf springs, each of which is a chord member connecting 2 points on an arc on the rim forming an almost equal angle at the center, the two extremities of each of the leaf springs being supported by the rim member, the central portion thereof being supported by the axle.

In the suspending device, when the vehicle is running, shocks given by he road surface is transferred to the axle through the rim member of the wheel, the leaf springs and the supporting bodies and the shocks are alleviated by the leaf springs disposed on this path.

DETAILED DESCRIPTION

Figure 1:
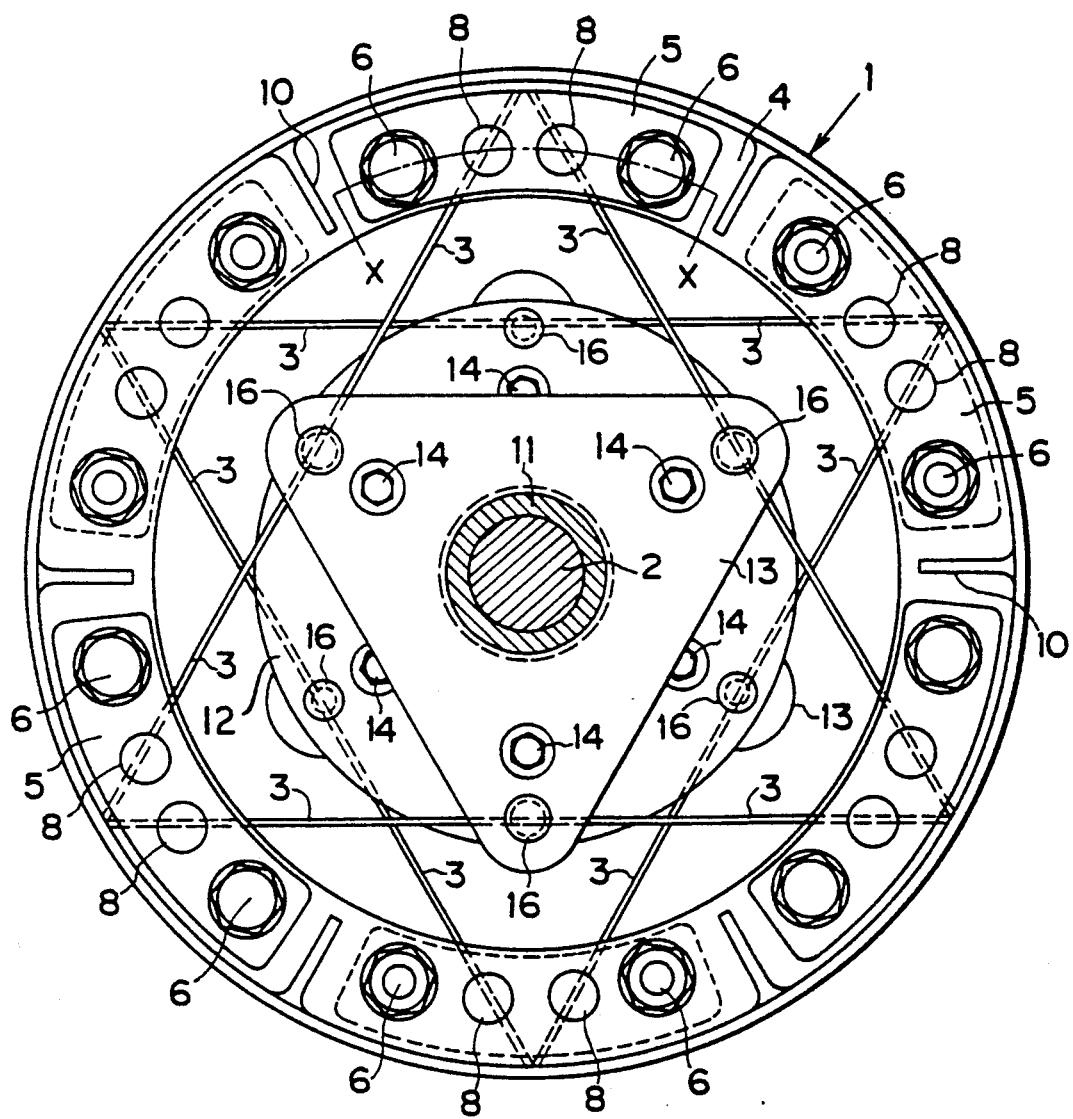
FIG. 1 is a plan view of a suspending device showing an embodiment of the present invention.

FIGS. 1, 2, 3 and 4 show an embodiment of the present invention, in which reference numeral 1 is a rim member constituting the wheel and 2 is the axle. Inside of the rim member 1 there are disposed six leaf springs 3 as chord members forming sides of two equilateral triangles, which are deviated by 60° from each other and whose apices are on the rim member. The two extremities of each of the leaf springs are supported by the rim member and the central portion thereof is supported by the axle through means described later.

That is, arc-shaped attached plates 5 separately prepared are disposed over a standing plate 4 protruding radially in a ring shape from the inner surface of the rim member 1 with a predetermined distance, opposite to each other. They are linked and supported with each other by using fixing means, screws 6 and nuts 7. Further shaft members 8 are linked and supported between the standing plate 4 and the attached plate 5. Each of the leaf springs 3 is supported slidingly by each of the shaft members 8, passing through the latter. The two ends of each of the leaf springs 3 are supported by the rim member through such means and the extremity thereof is brought into contact with a wedge-shaped protruding portion 1a formed on the inner surface of the rim member. Element 9 is a spacer member and 10 is a reinforcing member.

On the other hand, a sleeve 11 is secured to the axle 2 described above by inserting the latter in the former. On the two sides of a flange-shaped plate 12 protruding in one body from the central portion of the sleeve 11 there are disposed two equilateral triangular supporting plates 13 spline-jointed with a predetermined distance with the sleeve 11, respectively, opposite to each other and they are linked with each other by using fixing means, screws 14 and nuts 15. Further shaft members 16 are linked and supported between the flange-shaped plate 12 and the supporting plates 13. Each of the leaf springs 3 is supported slidingly by each of the shaft members 16, passing through the latter. 18 is a spacer member.

The sleeve 11 described above, in which the axle 2 is inserted, is held by a nut 19 screwed at the extremity of the axle so as not to fall out therefrom. A cap 20 spline-jointed is attracted by a magnet 21 to be held on the nut 19. Further an antirotational protrusion 20a having a rectangular cross-section, which is inserted in a hole having also a rectangular cross-section and formed in the end surface of the axle, is formed on the inner surface of the cap 20. Element 20b indicates a spline.

The cap 20 described above acts effectively as an antirotational member of the nut 19. That is, the cap 20 is held in a non-rotatable state with respect to the axle 2 by inserting the protrusion 20a having a rectangular cross-section in the hole having also a rectangular cross-section and formed in the end surface of the axle 2. Therefore the nut 19 jointed to the cap 20 held in the non-rotatable state by means of the spline 20b is secured to the axle 2 non-rotatably. Further, since the cap 20 is attracted by the magnet 21, it is prevented that it is fallen out in the axial direction.

Figure 2:
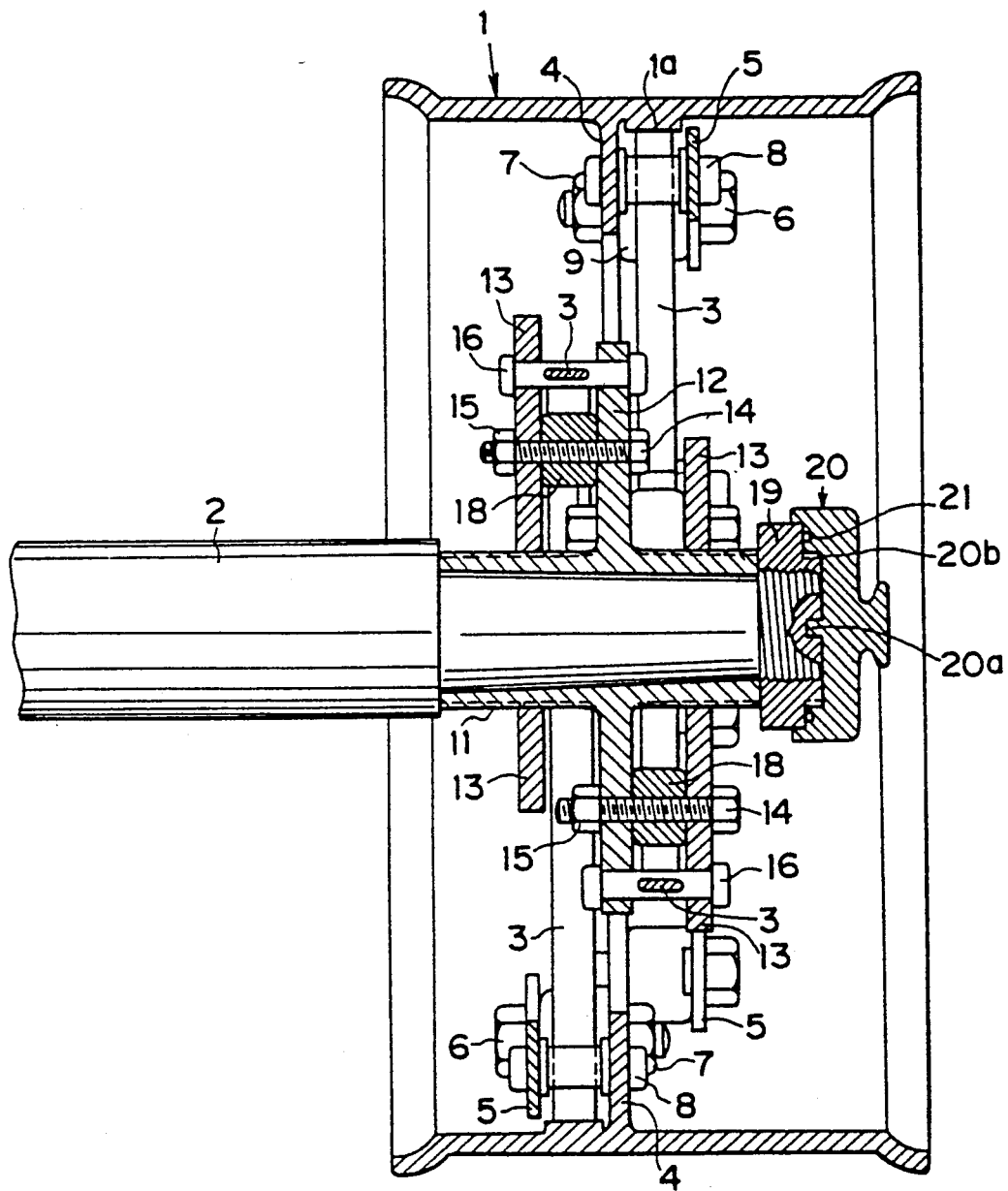
FIG. 2 is a longitudinal cross-sectional view thereof.
Figure 2A:
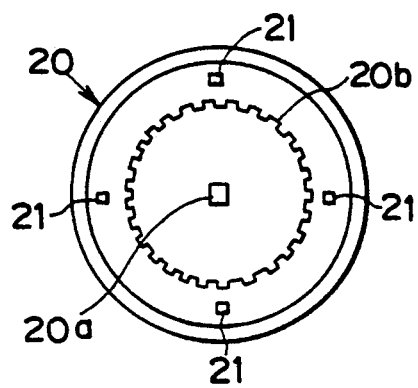
FIG. 2A is a front view of a cap viewed from the inner side.
Figure 2B:
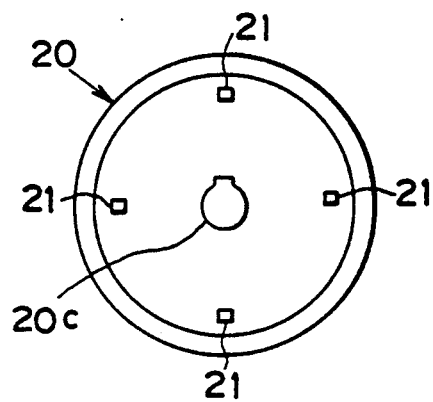
FIGS. 2B and 2C are front views of caps of other embodiments viewed from the inner side.
Figure 2C:
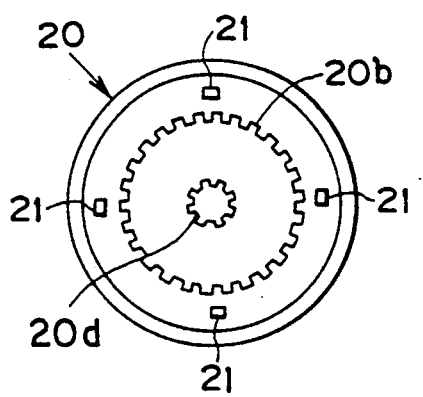

As a measure to hold the cap 20 in the non-rotatable state with respect to the axle 2, a round protrusion 20c having a key may be inserted in a round hole having a groove formed in the end surface of the axle, as indicated in FIG. 2B. Further a protrusion 20d having splines may be inserted in a hole having corresponding splines formed in the end surface of the axle, as indicated in FIG. 2C. The latter case is advantageous in that the region of the insertion angle of the cap 20 is wider.

Figure 2D:
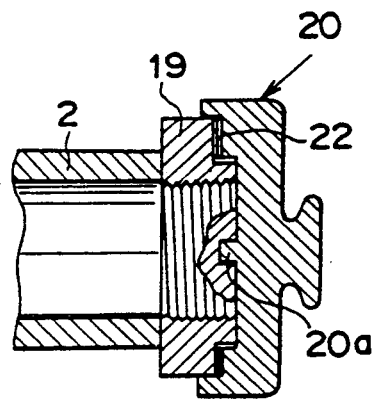
FIG. 2D is a cross-sectional view of an antirotational part according to another embodiment.
Figure 2E:
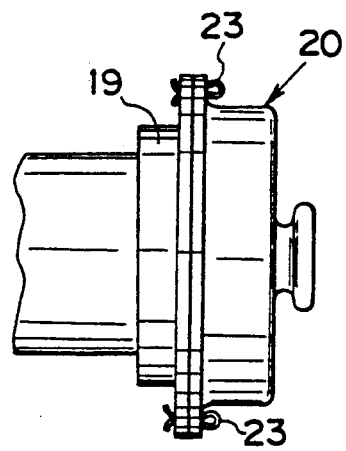
FIG. 2E is a side view of the antirotational part according to the other embodiment.
Figure 3:
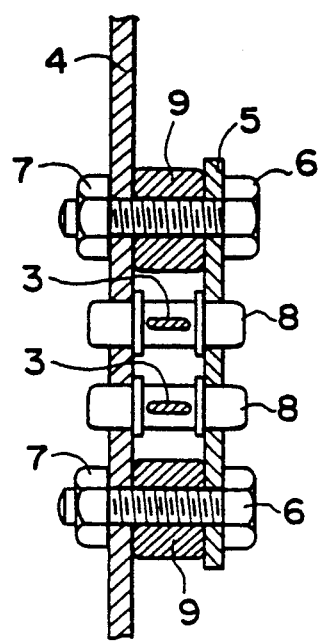
FIG. 3 is a cross-sectional view along a line X—X in FIG. 1.
Figure 4:
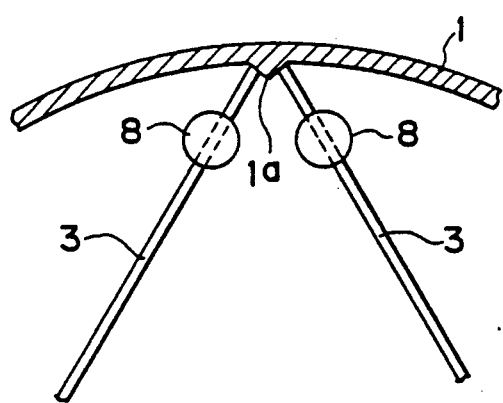
FIG. 4 is a cross-sectional view of a part, where leaf springs are brought into contact with the rim member.

As a measure to prevent the fall out of the cap 20, pressure sensitive adhesive tape 22 or tape jointed by the hooking action between loops and hooks (usually called magic tape) may be used therefor, as indicated in FIG. 2D. Further flanges disposed on the nut 19 and the cap 20 may be jointed by using split pins 23, as indicated in FIG. 2E.

In the construction described above, the rotation of the wheel 2 is transferred to the rim member 1 through the path of sleeve 11—flange plate 12—screws and nuts 14, 15 supporting plates 13—shaft members 16—leaf springs 3—shaft members 8 standing plate 4—screws and nuts 6, 7 and thus the rim member 1 rotates together with the axle 2.

In this way, when the vehicle runs, although shocks given to the wheel by the road surface are transferred to the axle through the path of rim member 1—shaft members 8—leaf springs 3—shaft members 16—flange plate 12—supporting plates 13—sleeve 11, they are alleviated by a number of leaf springs 3 existing in the path. In particular, when each of the leaf springs 3 receives a shock, bending takes place, the fulcrum being the shaft member 16 supporting the central portion thereof, the two extremities thereof acting as points of application, so that it absorbs the shock.

Consequently, according to the construction of the suspending device described above, shocks given by the road surface are absorbed by the suspending device mounted inside of the wheel. It is a matter of course that, in addition, also a tire serves for absorbing the shocks, similarly to a prior art wheel.

Material, width, thickness, etc. of the leaf spring 3 described above may be suitably determined in the design and further a plurality leaf springs superposed on each other may be used therefor. Furthermore leaf springs 3 are disposed not always on an equilateral triangle but they may be arranged also in a quadrilateral, a hexagon, etc. if they are disposed so as to be chords of the rim member. Still further, if the number of leaf springs disposed parallelly in the axial direction is increase, the buffering power can be raised correspondingly.

When the suspending device is repaired, similarly to repair of the tire, repair, inspection, etc. can be effected easily by dismounting the wheel from the axle.

As explained above, according to the present invention, since the suspending device is so constructed that a plurality of leaf springs are disposed inside of a rim member constituting a wheel so that each of them is a chord member, the two extremities of which are supported by the rim member, the central portion thereof being supported by an axle, it is possible to intend to simplify remarkably the mechanism, to reduce the number of parts and to decrease the number of mounting steps. At the same time, remarkable effects can be obtained that works such as repair, inspection, etc. can be effected easily, etc. and it is possible to contribute considerably to this kind of industrial fields.

What is claimed is:

1. An apparatus comprising: an axle having a central axis; an annular rim extending around said axle concentric to said axis, said rim having on a radially inner side thereof a plurality of angularly spaced surface portions; first support means supported on said rim and including a plurality of first support portions which are angularly offset from each other, which are each spaced radially inwardly from a respective said surface portion on said rim, and which each have therethrough an opening; second support means supported on said axle and including a plurality of second support portions provided at locations spaced angularly about said central axis, said second support portions each having therethrough an opening; and a plurality of elongate leaf spring elements which are arranged as chord members with respect to said rim, each said leaf spring element having opposite ends which directly engage respective said surface portions on said rim, having a central portion which is slidably received in said opening in a respective one of said second support portions, and having between said central portion and each said end thereof a respective end portion which is slidably received in the opening through a respective one of said first support portions.

2. An apparatus according to claim 1, wherein said openings through said first support portions each have a first cross-sectional shape, said end portions of said leaf spring elements each having said first cross-sectional shape and a size slightly smaller than the size of said openings through said first support portions, and wherein said second support portions each have a second cross-sectional shape, and said central portions of said elongate elements each have said second cross-sectional shape and a size slightly smaller than that of said openings through said second support portions.

3. An apparatus according to claim 2, wherein said first cross-sectional shape and said second cross-sectional shape are each rectangular.

4. An apparatus according to claim 1, wherein said rim has a plurality of angularly spaced wedge-shaped portions on said radially inner side thereof, each said wedge-shaped portion having two surfaces thereon which form an acute angle with respect to each other, and which each serve as a respective one of said surface portions on said rim and each directly engage an end of a respective said leaf spring element.

5. An apparatus according to claim 1, wherein said first means includes a plurality of separate support elements which each extend in a direction approximately parallel to said central axis and which are each a respective one of said first support portions, and wherein said second means includes a plurality of separate elements which each extend in a direction approximately parallel to said central axis and which are each a respective one of said second support portions.

6. In a suspending device having a rim member serving as a wheel and a plurality of leaf springs disposed inside of said rim member so that each of said leaf springs is a chord member having two ends supported at spaced locations on said rim member and having a central portion supported on an axle, the improvement comprising a plurality of separate arc-shaped plates disposed at angularly offset locations along an annular standing plate protruding radially inwardly a predetermined distance from an inner surface of said rim member, each of said arc-shaped plates being linked to and supported on said standing plate by fixing means, including a plurality of first shaft members which each extend between and are supported by the standing plate and one of said arc-shaped plates and which each have an opening therethrough, each of said leaf springs having end portions which are supported slidingly in the opening in a respective one of said shaft members and which engage a respective wedge-shaped protruding portion formed on an inner surface of the rim member, including a sleeve having the axle inserted therethrough and having an annular flange protruding radially from a central portion of the sleeve, including two supporting plates disposed on opposite sides of said flange and each spline-jointed with the sleeve, each of said supporting plates being linked to and supported on said flange by fixing means, including a plurality of second shaft members which each extend between and are supported by the flange and one of said supporting plates and which each have therethrough an opening slidably receiving a central portion of a respective said leaf spring, said sleeve being held on said axle by a nut screwed on an end portion of the axle, and including a cap spline-jointed on and attracted by a magnet to said nut, and having on an inner surface thereof an antirotational protrusion of non-circular cross-section which is non-rotatably inserted in a congruent hole of non-circular cross-section formed in an end surface of said axle.

7. A suspending device according to claim 6, wherein said protrusion on said cap is a round protrusion having a key, and said hole in said end surface of said axle is round and has a groove in a surface thereof.

8. A suspending device according to claim 6, wherein said protrusion on said cap is a protrusion having splines, and said hole in said end surface of said axle has splines therein.

9. A suspending device according to claim 6, wherein said protrusion on said cap is rectangular and said hole in said end surface of said axle is rectangular.

* * * * *